UNITED STATES PATENT OFFICE.

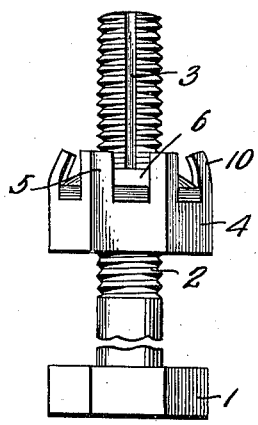
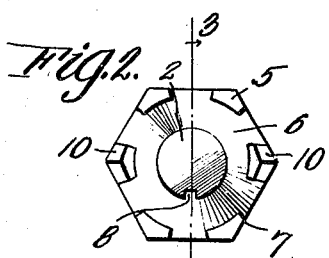
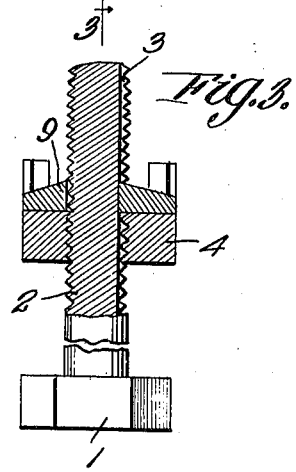

SAMUEL I. CLARK, OF JOLIETT, PENNSYLVANIA.

NUT-LOCK.

1,293,338.   Specification of Letters Patent.   Patented Feb. 4, 1919.

Application filed August 29, 1918. Serial No. 251,965.

*To all whom it may concern:*

Be it known that I, SAMUEL I. CLARK, a citizen of the United States, residing at Joliett, in the county of Schuylkill and State of Pennsylvania, have invented certain new and useful Improvements in Nut-Locks, of which the following is a specification.

This invention relates to nut and bolt locks, and more especially to those employing a locked nut; and the object of the same is to produce an improved device of this character which is extremely simple, inexpensive, and effective and in which when the shank of the bolt stands upright, the nut may be locked by gravity of the washer.

The invention lies in the use of a castellated nut, a washer provided with notches to receive the prongs of the nut and with a tongue extending into its bore, and a bolt having a longitudinal groove with which said tongue engages.

Details are set forth below and reference is made to the drawings, wherein:—

Figure 1 is an elevation showing a bolt with its shank upright and giving a side view of the nut locked in place thereon;

Fig. 2 is a plan of Fig. 1, and

Fig. 3 is a sectional view on the line 3—3 of Fig. 2.

The bolt is shown as having a head 1 and a shank 2 provided with threads and with a longitudinal groove 3 extending throughout the length of said threads. A nut 4 is herein shown as hexagonal, but that is not absolutely necessary. From its angles rise prongs 5 which give the nut a castellated appearance. The bore of the nut is threaded so as to run onto the threads of the shank 2. The numeral 6 designates a washer, preferably having the same size and contour as the nut, and at its angles is provided with cuts or notches indicated at 7 to drop over and fit into engagement with the prongs 5. The bore or opening through the washer has a tongue 8 which fits snugly within the groove 3. The washer is flat on its lower face to rest upon the top of the nut, but it can be rounded, conical or arched on its top as shown at 9 in Fig. 3.

In applying this improved device to a piece of work, the shank 2 of the bolt is run upward through the work, if we consider the position of parts as shown on the drawings, and the nut 4 is run down onto the threads of the shank until it contacts with the work or with a washer on the work if one be used. Now the washer 6 is slipped over the head of the shank, its tongue 8 engaging the groove 3, and allowed to drop into place with its notches 7 passing over the prongs 5 of the washer. If they do not properly engage the prongs, it may be necessary to turn the nut yet a little tighter. Eventually, however, they will do so, and the gravity of the washer will hold it in place upon the nut. The latter may not unscrew without carrying the washer with it, and obviously the washer cannot turn on the bolt because of the engagement of its tongue with the groove 3.

If the parts are applied horizontally to a piece of work, or possibly if the bolt is passed downward, through the work, the nut is screwed up from beneath, the locking of the nut is accomplished in substantially the same way, excepting that after the washer has been put in place, the tip of one of the prongs 5 must be bent inward a little over the top 9 of the washer, as indicated at 10 in Fig. 2, where two of these tips are shown as bent. This of course, positively prevents the dislodgment of the washer until the tips are again bent outward. Said bending in either direction may be effected by a slight tap of a hammer, or with the use of any ordinary tool.

A particular feature of this invention is the fact that it is inexpensively made, easy to operate, and reliable in use. While I have shown the casted nut as having prongs extending upward from all of its several angles, it is obviously not necessary that there be so many prongs, and similarly it is not absolutely necessary that the washer have notches 7 at its several angles. I consider it desirable, however, because in a hexagonal notch it would only be necessary to turn it one-twelfth of a revolution to find some position where the washer would drop down into the prongs when the tongue engaged the groove 3.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the appended claim.

Having thus described the invention, what I claim as new and desire to secure by Letters Patent is:—

In a nut lock, the combination with a bolt having a longitudinal groove through its threads; of a nut having upstanding prongs at its angles parallel with its bore and of one size throughout their length, and a washer of the same contour and size as the nut, flat on its lower face to rest thereon, notched in its angles to engage said prongs, conical on its upper face to permit the prongs to be bent over onto its face, and having a tongue within its bore to engage the groove in the bolt.

In testimony whereof I affix my signature in presence of two witnesses.

SAMUEL I. CLARK.

Witnesses:
  Jos. E. Boe,
  Jno. H. Heck.